US012680470B1

(12) United States Patent
Ganiger et al.

(10) Patent No.: US 12,680,470 B1
(45) Date of Patent: Jul. 14, 2026

(54) SQUEEZE FILM DAMPER ASSEMBLY FOR A TURBINE ENGINE

(71) Applicant: General Electric Company, Evendale, OH (US)

(72) Inventors: Ravindra Shankar Ganiger, Bengaluru (IN); Dinesh Rakwal, Bengaluru (IN); Bugra H. Ertas, Niskayuna, NY (US); Surender Reddy Bhavanam, Bengaluru (IN)

(73) Assignee: GENERAL ELECTIC COMPANY, Evendale, OH (US)

( * ) Notice: Subject to any disclaimer, the term of this patent is extended or adjusted under 35 U.S.C. 154(b) by 0 days.

(21) Appl. No.: 19/282,400

(22) Filed: Jul. 28, 2025

(51) Int. Cl.
*F01D 25/04* (2006.01)
*F01D 25/18* (2006.01)

(52) U.S. Cl.
CPC ............. *F01D 25/04* (2013.01); *F01D 25/18* (2013.01); *F05D 2260/96* (2013.01); *F05D 2260/98* (2013.01)

(58) Field of Classification Search
CPC .......... F02C 7/06; F16C 27/045; F01D 25/04; F01D 25/18; F01D 25/20; F01D 25/22; F01D 9/065; F05D 2260/96; F05D 2260/98
See application file for complete search history.

(56) References Cited

U.S. PATENT DOCUMENTS 3,456,992 A 7/1969 Kulina
5,067,825 A 11/1991 Vance et al.
5,099,966 A 3/1992 Wohrl
5,149,206 A 9/1992 Bobo
5,178,400 A * 1/1993 Singh .................... F16C 27/045 277/916
5,320,134 A 6/1994 Singh
9,494,048 B1 11/2016 Parnin
9,879,720 B2 1/2018 Ertas et al.
10,309,455 B2 6/2019 Obara et al.
10,683,798 B2 * 6/2020 Noda ......................... F16N 7/32
10,934,888 B2 3/2021 Avis et al.
(Continued)

FOREIGN PATENT DOCUMENTS

FR 3088680 B1 11/2020
FR 3127024 A1 3/2023
FR 3127025 A1 3/2023

*Primary Examiner* — Nathaniel E Wiehe
*Assistant Examiner* — Maxime M Adjagbe
(74) *Attorney, Agent, or Firm* — Venable LLP; Duarte Y Ho; Michele V. Frank

(57) ABSTRACT

A squeeze film damper assembly for a turbine engine includes an annular bearing support and an annular damper housing. The annular bearing support includes an inner support segment and an outer support segment located radially outward of the inner support segment. The inner support segment and the outer support segment are spaced apart to define a support channel therebetween. The annular damper housing is at least partially received in the support channel to define an inner damping chamber and an outer damping chamber, the inner damping chamber being radially inward of the outer damping chamber, the inner damping chamber and the outer damping chamber each capable of being filled with an amount of lubricant to provide a squeeze film damper at the inner damping chamber, the outer damping chamber, or both.

20 Claims, 11 Drawing Sheets

(56) References Cited

U.S. PATENT DOCUMENTS

| | | | | |
|---|---|---|---|---|
| 2019/0071998 | A1* | 3/2019 | Gysling | F16F 15/0237 |
| 2020/0018401 | A1* | 1/2020 | Tokunaga | F16J 15/445 |
| 2021/0025291 | A1* | 1/2021 | Ivakitch | F16C 27/045 |
| 2023/0175511 | A1* | 6/2023 | Pillis | F04C 27/009<br>418/201.1 |

* cited by examiner

SQUEEZE FILM DAMPER ASSEMBLY FOR A TURBINE ENGINE

TECHNICAL FIELD

The present disclosure relates generally to squeeze film damper assemblies for turbine engines.

BACKGROUND

Turbine engines, for example, for an aircraft, generally include a fan section and a turbo-engine to drive the fan section. Turbo-engines generally include a compressor section, a combustion section, and a turbine section in a serial flow arrangement. The turbine engine includes bearing damper assemblies to facilitate rotation between relative parts. The bearing damper assemblies include dampers to reduce vibration from the rotation between relative parts.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
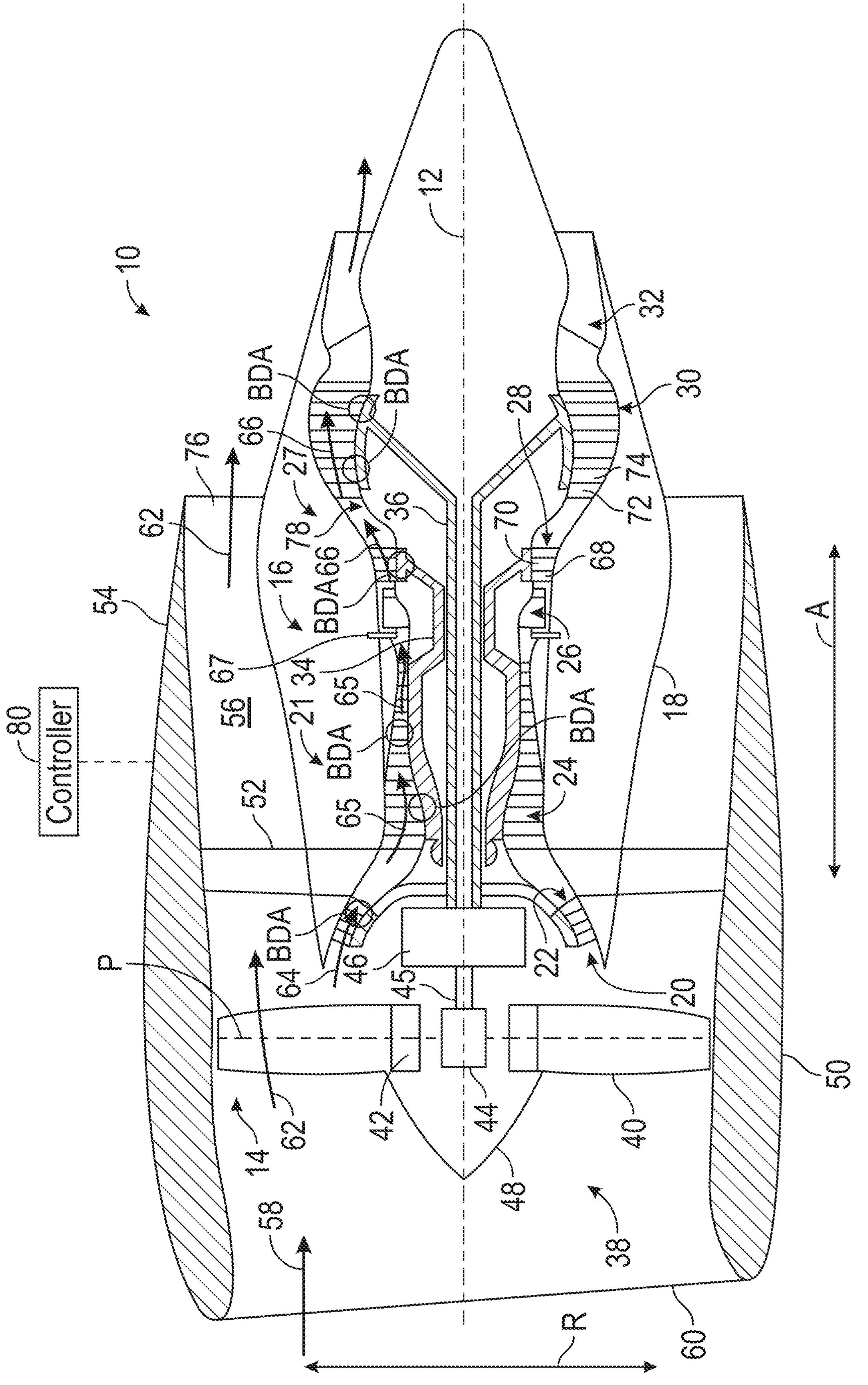
FIG. 1 is a schematic, cross-sectional view of a turbine engine, taken along a centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. More particularly, forward and aft are used herein with reference to a direction of travel of the vehicle and a direction of propulsive thrust of the gas turbine engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the longitudinal centerline axis of the turbine engine.

As used herein, "redline speed" means the maximum expected rotational speed of a shaft or a rotor during normal operation of a turbine engine. The redline speed may be expressed in terms of rotations per second in Hertz (Hz), rotations per minute (RPM), or as a linear velocity of the outer diameter of the shaft in terms of feet per second. For a turbine engine that has a high speed shaft and a low speed shaft, both the high speed shaft and the low speed shaft have redline speeds.

As used herein, "critical speed" means a rotational speed of a shaft or a rotor of a turbine engine that is about the same as a fundamental, or a natural frequency, of a first-order bending mode of the shaft (e.g., the shaft rotates at eighty Hz and the first-order modal frequency is eighty Hz). When the shaft rotates at the critical speed, the shaft is expected to have a maximum amount of deflection, hence, instability, due to excitation of the first-order bending mode of the shaft. The critical speed may be expressed in terms of rotations per second in Hz, RPM, or as a linear velocity of the outer diameter of the shaft in terms of feet per second.

The term "supercritical speed," as used herein, refers to a rotational speed of a shaft or a rotor of a turbine engine that is above a fundamental, or a natural frequency of a first-order bending mode of the shaft (e.g., the shaft rotates at eighty Hz while the first-order modal frequency is about seventy Hz). A "supercritical shaft" is a shaft that has a redline speed above the critical speed of the shaft.

As used herein, the term "rotating component" refers to any component of a rotary machine, such as a turbine engine, that rotates about an axis of rotation. By way of example, a rotating component may include a shaft or a spool of a turbine engine, such as a fan shaft, a high-pressure shaft, a low-pressure shaft, etc. Likewise, the term "static component," as used herein, refers to any stationary or non-rotating component of a turbine engine that has a coaxial configuration and arrangement with a rotating component of the turbine engine. A static component may be disposed radially inward or radially outward along a radial axis in relation to at least a portion of a rotating component. Additionally, or alternatively, a static component may be disposed axially adjacent to at least a portion of a rotating component.

As used herein, the term "additive manufacturing technology" or "additive manufacturing techniques or processes" generally refer to manufacturing processes wherein successive layers of material(s) are provided on each other to "build-up," layer-by-layer, a three-dimensional component. The successive layers generally fuse together to form a monolithic component that may have a variety of integral sub-components. Although additive manufacturing technology is described herein as enabling fabrication of complex objects by building objects point-by-point, layer-by-layer, typically, in a vertical direction, other methods of fabrication are possible and within the scope of the present subject matter. For example, although the discussion herein refers to the addition of material to form successive layers, one skilled in the art will appreciate that the methods and the structures disclosed herein may be practiced with any additive manufacturing technique or manufacturing technology. For example, embodiments of the present disclosure may use layer-additive processes, layer-subtractive processes, or hybrid processes.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values, and/or endpoints defining range(s) of values.

Generally, a turbine engine (e.g., a turbofan engine) may facilitate transfer of energy between a fluid and a rotating component (e.g., a rotor). For example, a compressor of a turbofan engine may utilize the rotating component to transfer energy to the fluid by compressing the fluid. Further, a turbine engine may also use the rotating component to extract energy from a flow of the fluid. To facilitate the transfer of energy, a tangential force may actuate (e.g., rotate) the rotating component. However, the rotating component may exert an axial force and a radial force on the rest of the turbine engine. For example, rotation of the rotating component may cause mass imbalance and, thus, vibrations (e.g., radial forces) in the turbine engine. Additionally, due to gravity, the rotating component may exert a radial (e.g., downward) force. Furthermore, when the turbine engine is in operation, the rotating component may exert an axial (e.g., thrust) force.

To help account for these various forces exerted by the rotating component, the turbine engine may include one or more bearing damper assemblies. For example, a bearing damper assembly may dissipate vibrations (e.g., dynamic radial forces) produced on the rotating component, thereby reducing the vibrations transferred to the rest of the turbine engine. Additionally, a bearing damper assembly may support the rotating component against other radial forces and axial forces to facilitate actuation of the rotating component. However, in some instances, tuning a bearing damper assembly to account for the other radial forces and axial forces may affect the ability of the bearing to dissipate vibrations.

One solution, for example, is a bearing damper assembly that may include a damper, e.g., a segmented squeeze film damper, which can include multiple annular gaps and bearings coupled between the damper and the rotating component. As such, a force exerted on the rotating component may be transferred to the damper through the bearings. For example, vibrations produced on the rotating component may propagate from the rotating component, through the bearings, and into the damper, where such vibrations may be dissipated by fluid in the one or more annular gaps thereof.

However, some turbine engines may require rotating components thereof (e.g., a low-pressure shaft or a high-pressure shaft) to have the ability to operate at super-critical speeds. Operation at supercritical speeds brings several challenges in rotor dynamics, including high speed stability and synchronous response to rotor imbalance. Furthermore, super-critical rotors require traversing through several rotor modes before achieving redline operating speeds. Thus, there is an optimum damping requirement for each mode and operating speed. For example, overly large damping force coefficients can lead to lowered stability margins and high dynamics bearing loads, and sufficiently low damping values can have the same effect. In other words, each operating mode requires an optimum damping value. However, traditional squeeze film dampers are typically designed for a single damping target value and do not have the capability to vary damping values as needed.

Accordingly, the present disclosure provides an improved squeeze film damper assembly for a bearing damper assembly of a turbine engine that has variable damping modes that can be used for various operating modes of the turbine engine. Particularly, embodiments of the present disclosure can provide a squeeze film damper assembly with multiple annular damping regions, such as a first radially inner damping region and a second radially outer damping region, that can be activated independent of one another to provide various damping values of the squeeze film damper assembly. This can increase operational performance and durability of the bearing damper assembly and the turbine engine over a range of operating speeds.

Referring now to the drawings, FIG. 1 is a schematic, cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low-pressure (LP) compressor 22 followed downstream by a high-pressure (HP) compressor 24. The combustion section 26 is downstream of the compressor section 21. The turbine section 27 is downstream of the combustion section 26 and includes a high-pressure (HP) turbine 28 followed downstream by a low-pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of the fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62, is routed into the bypass airflow passage 56, and a second portion of air, also referred to as core air 64, is routed into the upstream section of the core air flow path through the core inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustion section 26, where the compressed air 65 is mixed with fuel 67 and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (e.g., a self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (e.g., a self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop engines, or turboshaft engines.

Figure 2:
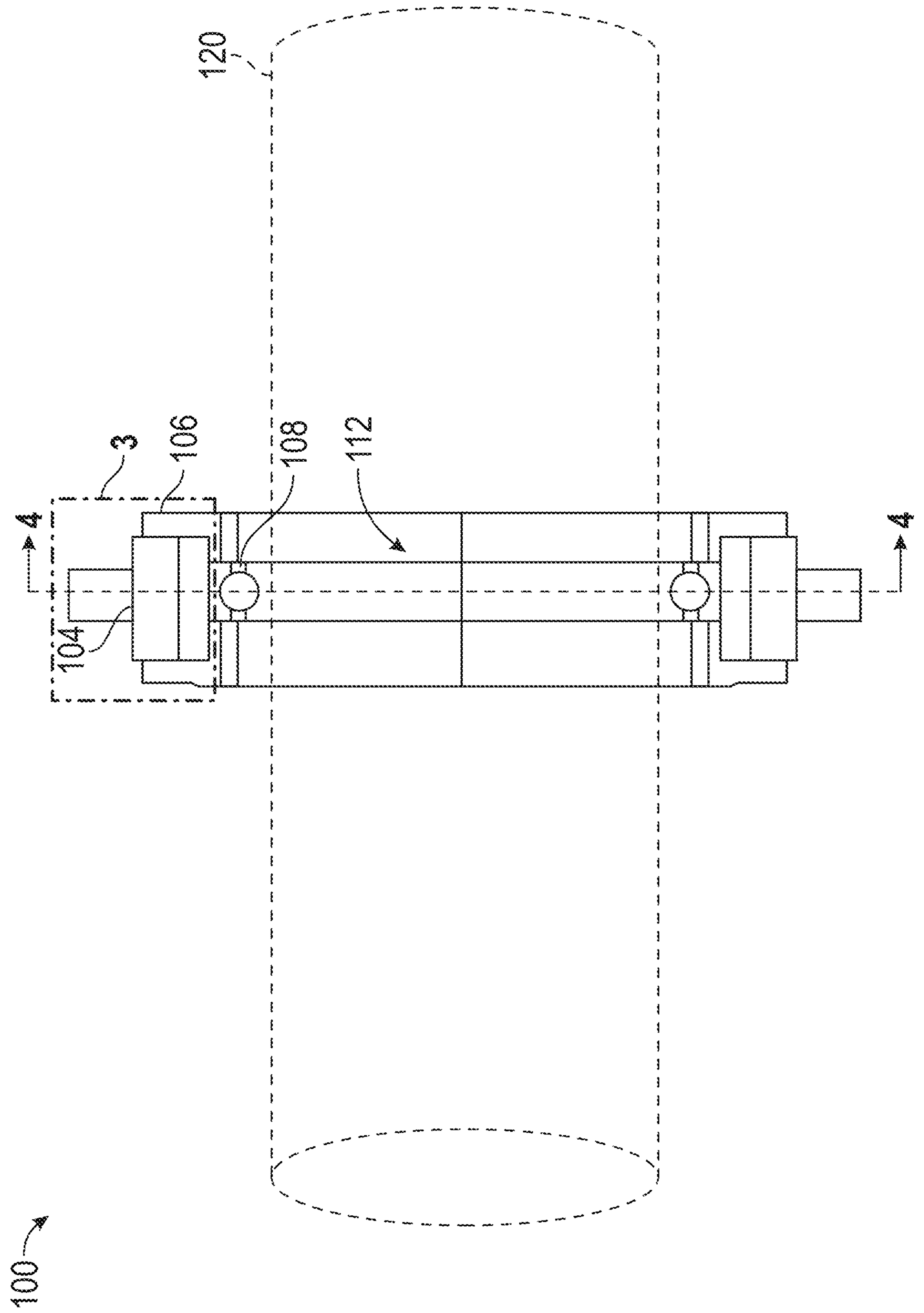
FIG. 2 is a schematic view of a bearing damper assembly for the turbine engine of FIG. 1, taken along the longitudinal centerline axis of the turbine engine, according to the present disclosure.

FIG. 2 is a schematic view of an exemplary bearing damper assembly 100 for the turbine engine 10 (FIG. 1), taken along the longitudinal centerline axis 12 (FIG. 1) of the turbine engine 10, according to the present disclosure. The bearing damper assembly 100 can be utilized to engage and to support a rotating component 120 of the turbine engine 10. The bearing damper assembly 100 can be used to support any rotating component of the turbine engine 10, or between any rotating component of other turbine engines. Particularly, the rotating component 120 may be any rotating component of the turbo-engine 16 (e.g., the LP shaft 36 or the HP shaft 34) of the turbine engine 10 (FIG. 1). By way of example, circles (BDA) of FIG. 1 provide example locations at which the bearing damper assembly 100 of the present disclosure may be incorporated into the turbine engine 10. In some embodiments, the turbine engine 10 may include one or more bearing damper assemblies 100 at various suitable locations as indicated by circles BDA.

As shown in FIG. 2, the bearing damper assembly 100 includes a bearing housing 104, end seals 106, and bearings 108. The bearings 108 are coupled to an inner surface of the bearing housing 104 and define an annular region 112, which may support the rotating component 120. As described above, the bearings 108 may facilitate rotation of the rotating component 120, for example, by reducing friction that resists rotation. In the illustrated embodiment, the bearings 108 are ball bearings. In some embodiments, the bearings 108 may be, e.g., journal bearings (i.e., porous bearing pads that deliver gas into the annular region 112). The bearings 108 are coupled between the bearing housing 104 and the rotating component 120. As such, the rotating component 120 may exert a force through the bearings 108 onto the bearing housing 104. For example, gravity may pull downward on the rotating component 120, thereby causing the rotating component 120 to exert a radial force on the bearing housing 104. Additionally, thrust from movement of the turbine engine 10 may cause the rotating component 120 to exert an axial force on the bearing housing 104.

Furthermore, during operation of the turbine engine 10, vibrations may be produced on the rotating component 120 (e.g., due to mass imbalance) that may propagate into the bearing housing 104. In some instances, vibrations of the rotating component 120 may affect operation of the turbine engine 10, for example, by disturbing or displacing other components. As such, the bearing housing 104 may be used to damp (e.g., dissipate) vibrations of the rotating component 120, thereby reducing likelihood of vibrations affecting operation of the turbine engine 10. As will be described in further detail below, the bearing housing 104 of the bearing damper assembly 100 houses a squeeze film damper assembly that utilizes fluid in one or more annular gaps formed between an inner diameter and an outer diameter of the bearing housing 104.

Figure 3:
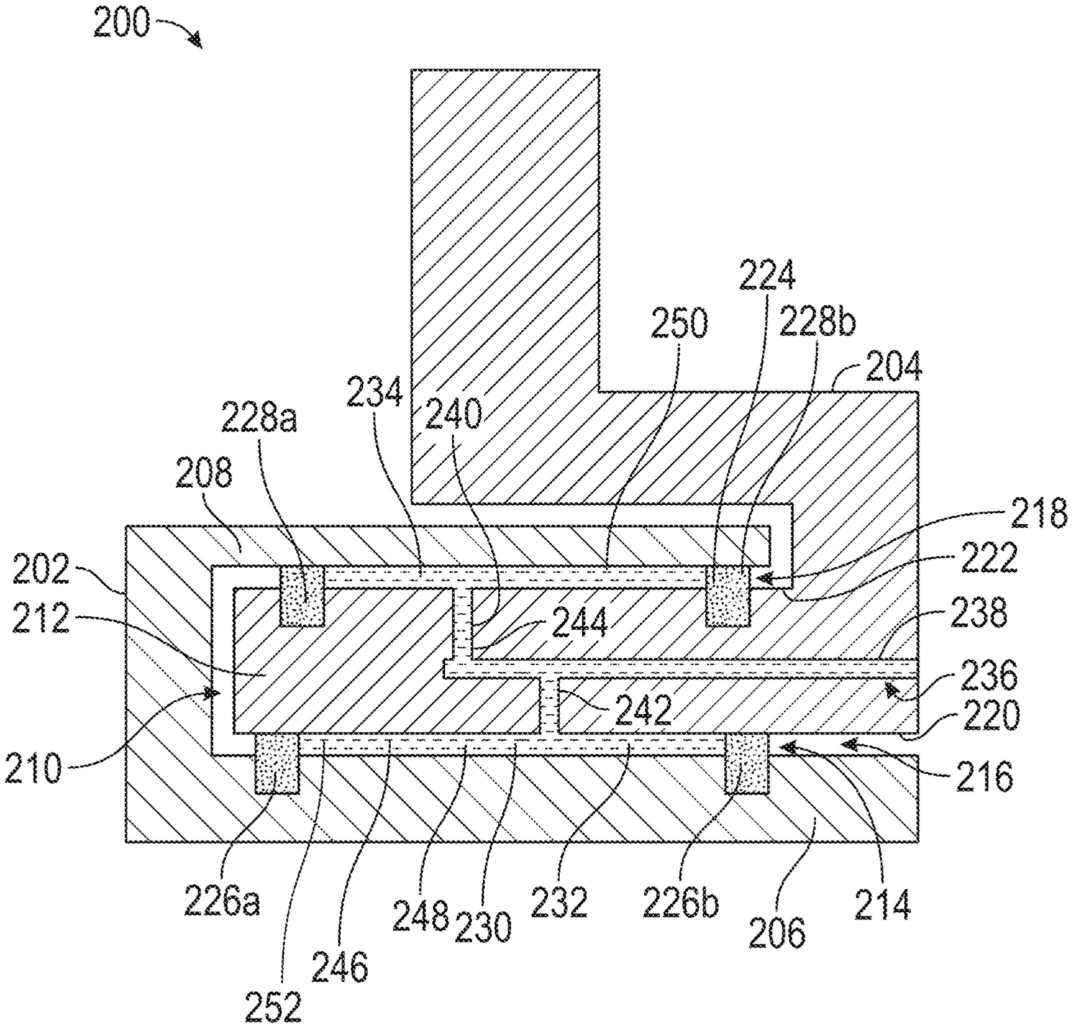
FIG. 3 is a schematic, cross-sectional view of a squeeze film damper assembly for the bearing damping assembly, taken at detail 3 of FIG. 2, according to the present disclosure.

FIG. 3 is a schematic, cross-sectional view of a squeeze film damper assembly 200 for the bearing damper assembly 100, taken at detail 3 of FIG. 2, according to the present disclosure. The squeeze film damper assembly 200 is isolated from the bearing damper assembly 100 for clarity in FIG. 3. The squeeze film damper assembly 200 is located within the bearing housing 104 (FIG. 2). The squeeze film damper assembly 200 includes an annular bearing support 202, such as an outer race, that supports the bearings 108 (FIG. 2). The annular bearing support 202 includes an inner support segment 206, also referred to as an inner support arm, extending in the axial direction and a radially outer support segment 208, also referred to as an outer support arm, located radially outward of the inner support segment 206 and extending in the axial direction. The inner support segment 206 and the outer support segment 208 are spaced apart radially to define a support channel 210 therebetween. The inner support segment 206 and the outer support segment 208 can be substantially parallel.

The squeeze film damper assembly 200 further includes an annular damper housing 204. The damper housing 204 includes an axially extending housing segment 212, also referred to as a housing arm. The housing segment 212 is arranged within the support channel 210, between the inner support segment 206 and the outer support segment 208. More specifically, the housing segment 212 is arranged within the support channel 210 such that the housing segment 212 is spaced from both the inner support segment 206 and the outer support segment 208. This arrangement creates gaps 214 between the annular bearing support 202 and the damper housing 204. The gaps 214 include an inner gap 216 between a radially inner surface 220 of the housing segment 212 and the inner support segment 206 and an outer gap 218 between a radially outer surface 222 of the housing segment 212 and the outer support segment 208.

Referring still to FIG. 3, the squeeze film damper assembly 200 includes a plurality of seals 224. The plurality of seals 224 are placed at the gaps 214 to define axial limits of the gaps 214 to create damping chambers 230. More specifically, the plurality of seals 224 includes a first inner seal **226*a* and a second inner seal 226*b* placed at the inner gap 216 to define an inner damping chamber 232, and a first outer seal 228*a* and a second outer seal 228*b* placed at the outer gap 218 to define an outer damping chamber 234. The inner damping chamber 232 is defined in the axial direction by the first inner seal 226*a* and the second inner seal 226*b* and in the radial direction by the inner surface 220 of the housing segment 212 and the inner support segment 206. Similarly, the outer damping chamber 234 is defined in the axial direction by the first outer seal 228*a* and the second outer seal 228*b* and in the radial direction by the outer surface 222 and the outer support segment 208. The plurality of seals 224 can be piston seals. In some embodiments, the plurality of seals 224 can be O-rings. As will be described in more detail below, the inner damping chamber 232, the outer damping chamber 234, or both, can be provided with lubricant 252 to activate squeeze film dampers 246. In some embodiments, the annular bearing support 202, the damper housing 204**, or both, can have additional segments or arms to create additional chambers.

The squeeze film damper assembly 200 includes a lubricant circuit 236 for variably delivering the lubricant 252, such as oil, to the damping chambers 230. The lubricant circuit 236 is formed in the damper housing 204. As will be shown in the discussion for FIGS. 4A-4B, the lubricant circuit 236 fluidly connects the damping chambers 230 to a lubricant source, such as an oil tank 304 (FIG. 5). The lubricant circuit 236 includes a main circuit 238 and a plurality of branch circuits 240 formed in the housing segment 212 of the damper housing 204. The main circuit 238 travels axially along the housing segment 212 of the damper housing 204. The branch circuits 240 extend from the main circuit 238 and fluidly connect the main circuit 238 to the damping chambers 230 to deliver the lubricant 252 to the damping chambers 230. More specifically, the branch circuits 240 include a first branch circuit 242 fluidly connecting the main circuit 238 to the inner damping chamber 232 and a second branch circuit 244 fluidly connecting the main circuit 238 to the outer damping chamber 234. While the main circuit 238 is illustrated to extend out of the damper housing 204 in the axial direction, the main circuit 238 can take any other route through the damper housing 204. In some embodiments, the main circuit 238 can initially extend axially through the housing segment 212 and then turn to extend radially out the damper housing 204 instead.

As noted above, the squeeze film dampers 246 are activated when the inner damping chamber 232, the outer damping chamber 234, or both, are filled with the lubricant 252. The squeeze film dampers 246 include an inner squeeze film damper 248 formed at the inner damping chamber 232 when the inner damping chamber 232 is provided with the lubricant 252 and an outer squeeze film damper 250 formed at the outer damping chamber 234 when the outer damping chamber 234 is provided with the lubricant 252. The inner squeeze film damper 248 and the outer squeeze film damper 250 provide dual annular damping regions at two different radial locations. As will be discussed in more detail in the discussion for FIG. 5, the inner squeeze film damper 248 and the outer squeeze film damper 250 can be selectively and independently activated. The squeeze film damper assembly 200 can include a first operational configuration where only the inner squeeze film damper 248 is activated, a second operational configuration where only the outer squeeze film damper 250 is activated, a third operational configuration where both the inner squeeze film damper 248 and the outer squeeze film damper 250 are activated, and a fourth operational configuration where neither the inner squeeze film damper 248 nor the outer squeeze film damper 250 are activated. The various operational configurations can target different damping values to provide various damping modes. As an example, the inner squeeze film damper 248, when activated, can target a first damping value, the outer squeeze film damper 250, when activated, can target a second damping value different from the first damping value, and the inner squeeze film damper 248 and the outer squeeze film damper 250, when activated in combination, can target a third damping value different from the first damping value and the second damping value. The first damping value, the second damping value, and the third damping value can be selected, as an example, to target known excitable vibration modes of the rotating component 120 (FIG. 2) supported by the bearing damper assembly 100. Dimensions of the damping chambers 230 can be variably chosen to achieve desired damping values, for example, based on the bending modes of the rotating component 120. The damping values of the squeeze film dampers 246 can be altered, for example, by adjusting an axial spacing of the seals 224 to lengthen or shorten the damping chambers 230. The damping values of the squeeze film dampers 246 can also be altered by adjusting a spacing of the gaps 214 to change a radial thickness of the damping chambers 230. The radial location of the damping chambers 230 also affects the damping value of the squeeze film dampers 246 at each of the respective damping chambers 230. A radially outer damping chamber, compared to a relatively radially inner damping chamber, has more fluid to compress and will provide a larger damping value. Thus, the outer squeeze film damper 250 will provide a larger damping value than the inner squeeze film damper 248. The damping values can also be altered by adjusting pressure, viscosity, or temperature of the lubricant 252 in the squeeze film dampers 246.

Figure 4A:
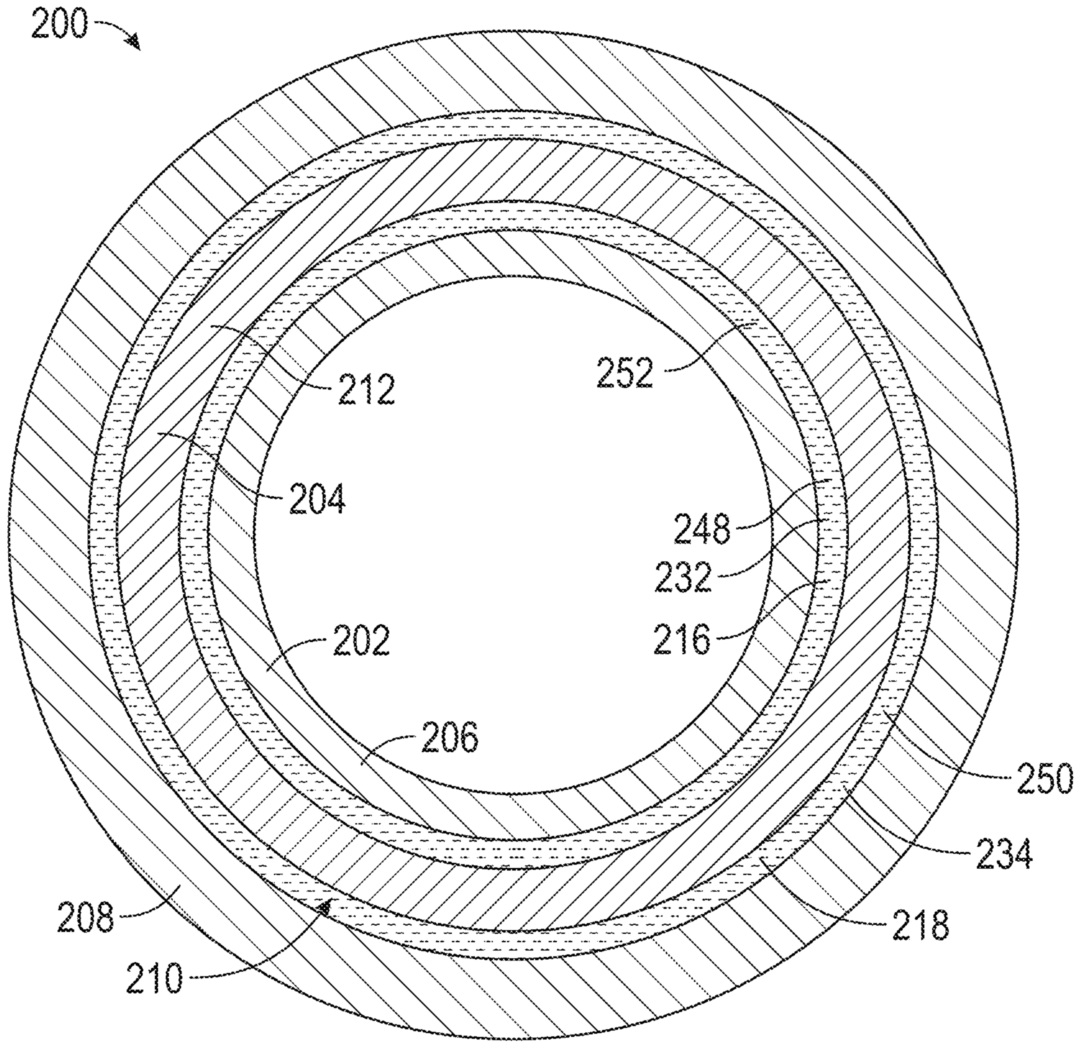
FIG. 4A is a schematic, cross-sectional view of the squeeze film damper assembly of FIG. 3, taken along axis 4-4 in FIG. 2, according to the present disclosure.
Figure 4B:
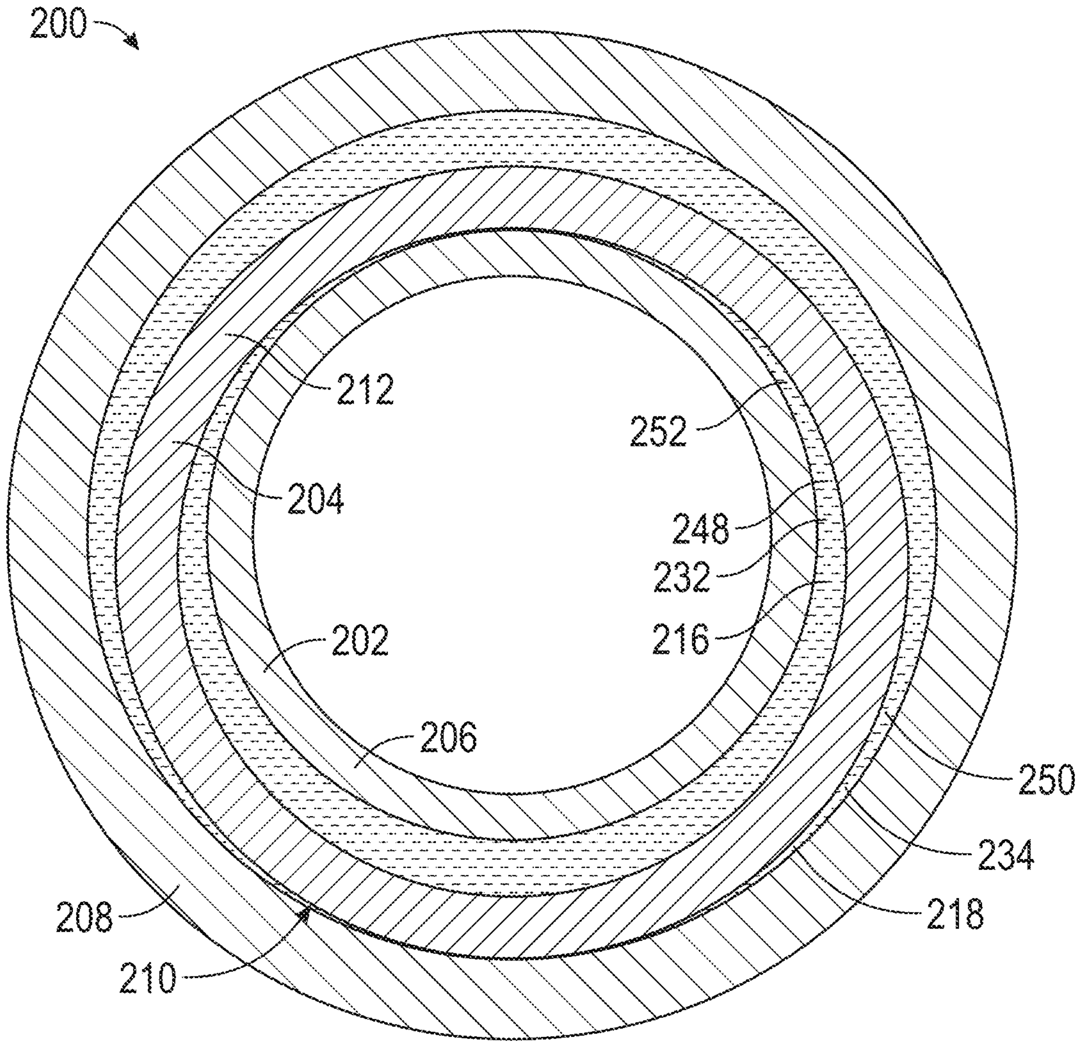
FIG. 4B is another schematic, cross-sectional view of the squeeze film damper assembly of FIG. 3, showing compression of dual annular damping regions, according to the present disclosure.
Figure 5:
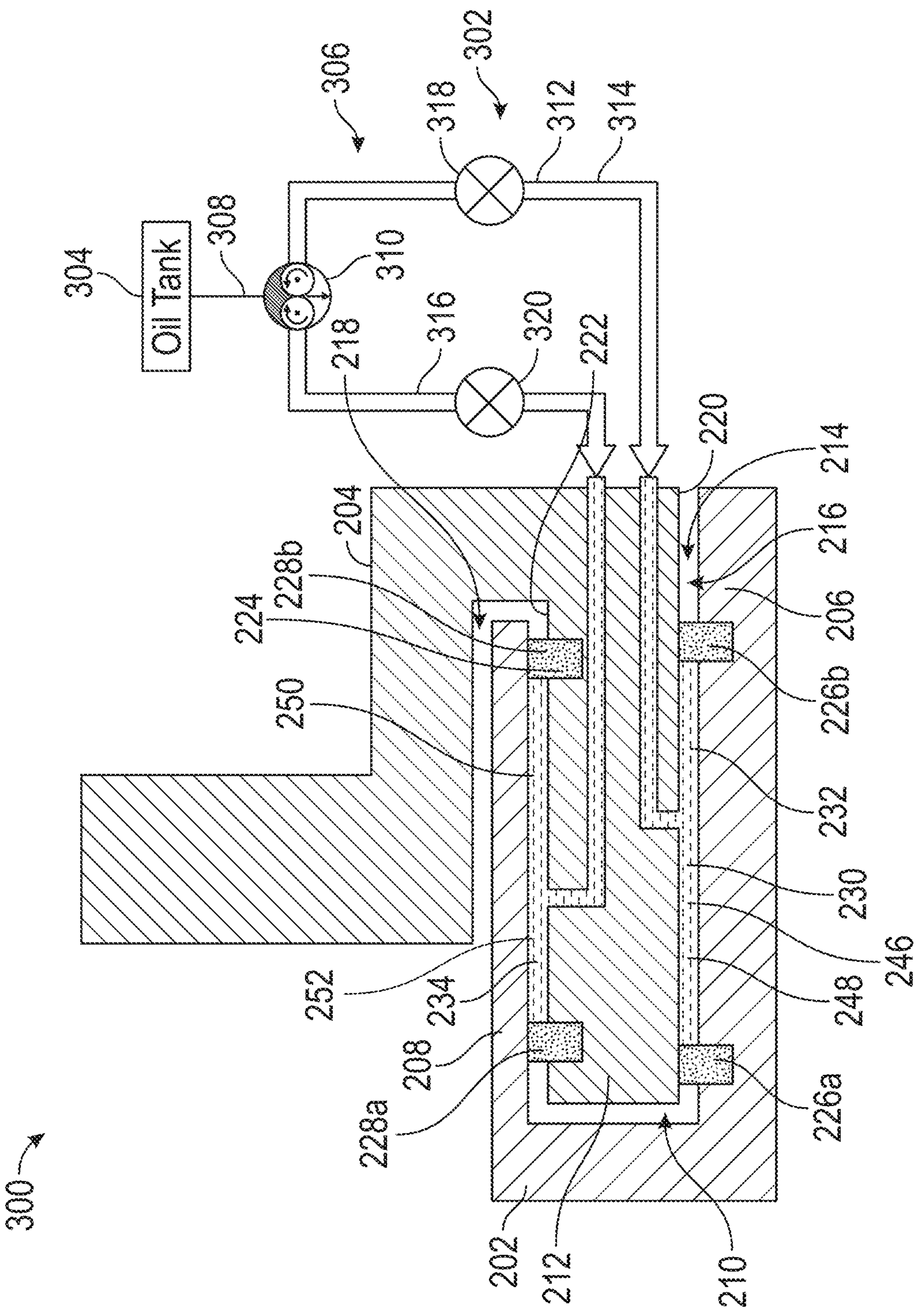
FIG. 5 is a schematic, cross-sectional view of a squeeze film damper assembly, according to another embodiment.

FIGS. 4A and 4B are schematic, cross-sectional views of the squeeze film damper assembly 200, taken along axis 4-4 in FIG. 2, according to the present disclosure. The bearings 108 and the rotating component 120 are removed in FIGS. 4A and 4B for clarity. As noted above, the housing segment 212 of the damper housing 204 is received in the support channel 210 formed between the inner support segment 206 and the outer support segment 208 of the annular bearing support 202. As shown in FIG. 4A, the housing segment 212 is arranged in the support channel 210 such that the housing segment 212 is spaced from the inner support segment 206 and the outer support segment 208 to form the inner gap 216 defining the inner damping chamber 232 and the outer gap 218 defining the outer damping chamber 234. The inner damping chamber 232, when filled with the lubricant 252, activates the inner squeeze film damper 248. The outer damping chamber 234, when filled with the lubricant 252, activates the outer squeeze film damper 250. The inner squeeze film damper 248 and the outer squeeze film damper 250, as illustrated in FIG. 4A, provides a dual annular arrangement of squeeze film dampers 246.

As noted above, the squeeze film damper assembly 200 includes multiple different operational configurations where the inner squeeze film damper 248, the outer squeeze film damper 250, both, or none, are activated. Each of the operational configurations target different damping values. FIG. 4A more clearly shows that the outer damping chamber 234 has a larger volume than the inner damping chamber 232, and as a result, the outer squeeze film damper 250 provides a larger volume of the lubricant 252 than the inner squeeze film damper 248. Thus, the second damping value of the outer squeeze film damper 250 is higher than the first damping value of the inner squeeze film damper 248. The third damping value provided when both the inner squeeze film damper 248 and the outer squeeze film damper 250 are activated is higher still than either the first damping value or the second damping value. As an illustrative example only, FIG. 4B shows the squeeze film damper assembly 200 in the third operational configuration where both the inner squeeze film damper 248 and the outer squeeze film damper 250 are activated, and with the housing segment 212 of the damper housing 204 biased in a downward direction (relative to the orientation of FIG. 4B). The housing segment 212 is simultaneously compressing a bottom portion (relative to the orientation of FIG. 4B) of the outer squeeze film damper 250 and a top portion (relative to the orientation of FIG. 4B) of the inner squeeze film damper 248. Thus, in the third operational configuration when both the inner squeeze film damper 248 and the outer squeeze film damper 250 are activated, the damper housing 204 simultaneously compresses against two squeeze film dampers. The effect of compression against two squeeze film dampers does not have to occur at the top portion of one squeeze film damper and the bottom portion of another squeeze film damper. As the squeeze film dampers 246 are annular, and the inner squeeze film damper 248 and the outer squeeze film damper 250 provide dual annual damping regions, dual compression occurs at all angular positions of the squeeze film damper assembly 200.

FIG. 5 is a schematic, cross-sectional view of a squeeze film damper assembly 300, according to another embodiment. The squeeze film damper assembly 300 is similar to the squeeze film damper assembly 200 as depicted in FIG. 3. Elements shared between the squeeze film damper assembly 300 and the squeeze film damper assembly 200 will be referred to using the same element numbers, and the description of those elements provided above for FIG. 3 is also applicable to FIG. 5. The squeeze film damper assembly 300 includes an oil management system 302 for controlling a flow of the lubricant 252 into the damping chambers 230. The oil management system 302 includes a lubricant source, such as an oil tank 304, to provide a supply of the lubricant 252 to the damping chambers 230. The oil tank 304 can be integrated as part of the bearing damper assembly 100 (FIG. 2). In some embodiments, the oil tank 304 can be disposed external to the bearing damper assembly 100, for example in another location in the turbine engine 10. The oil management system 302 includes a lubricant circuit 306 fluidly connecting the oil tank 304 to the damping chambers 230. The lubricant circuit 306 includes a main circuit 308 fluidly connecting the oil tank 304 to a pump 310. The pump 310 is configured to both deliver and remove the lubricant 252 from the squeeze film dampers 246. In some embodiments, the pump 310 can be divided into two separate pumps, such as a supply pump and a scavenge pump. The supply pump and the scavenge pump can share a common shaft onto which both pumps are mounted. The oil management system 302 further includes a plurality of branch circuits 312 fluidly connecting the pump 310 to the damping chambers 230. The branch circuits 312 can include a first branch circuit 314 and a second branch circuit 316. The first branch circuit 314 fluidly connects the pump 310 to the inner damping chamber 232. The second branch circuit 316 fluidly connects the pump 310 to the outer damping chamber 234. As depicted in FIG. 5, the branch circuits 312 extend at least partially through the damper housing 204. The oil management system 302 further includes a first lubricant control valve 318 disposed along the first branch circuit 314 and a second lubricant control valve 320 disposed along the second branch circuit 316. The first lubricant control valve 318 and the second lubricant control valve 320 restrict lubricant delivery and enable the oil management system 302 to selectively provide the lubricant 252 to the damping chambers 230. The first lubricant control valve 318 and the second lubricant control valve 320 are independently controlled to activate or deactivate the inner squeeze film damper 248 and the outer squeeze film damper 250 independently of each other. As noted above, selectively activating the inner squeeze film damper 248 and the outer squeeze film damper 250 allows the squeeze film damper assembly 300 to provide different damping levels. The first lubricant control valve 318 and the second lubricant control valve 320 can be actively managed, for example, based on engine operation conditions such as rotation speed or sensed pressures. The first lubricant control valve 318 and the second lubricant control valve 320 can also partially fill the damping chambers 230 to vary the damping levels provided by the squeeze film dampers 246 at each of the damping chambers 230.

The oil management system 302 also includes a controller 80 (FIG. 1) communicatively coupled to the oil management system 302 for controlling the flow of the lubricant 252 through the oil management system 302. The controller 80 can control actuation of the pump 310 to draw the lubricant 252 from the oil tank 304 into the main circuit 308. The controller 80 can further control and opening and closing of the first lubricant control valve 318 and the second lubricant control valve 320 to selectively allow the lubricant 252 to flow through the branch circuits 312, such as the first branch circuit 314 and the second branch circuit 316.

Figure 6:
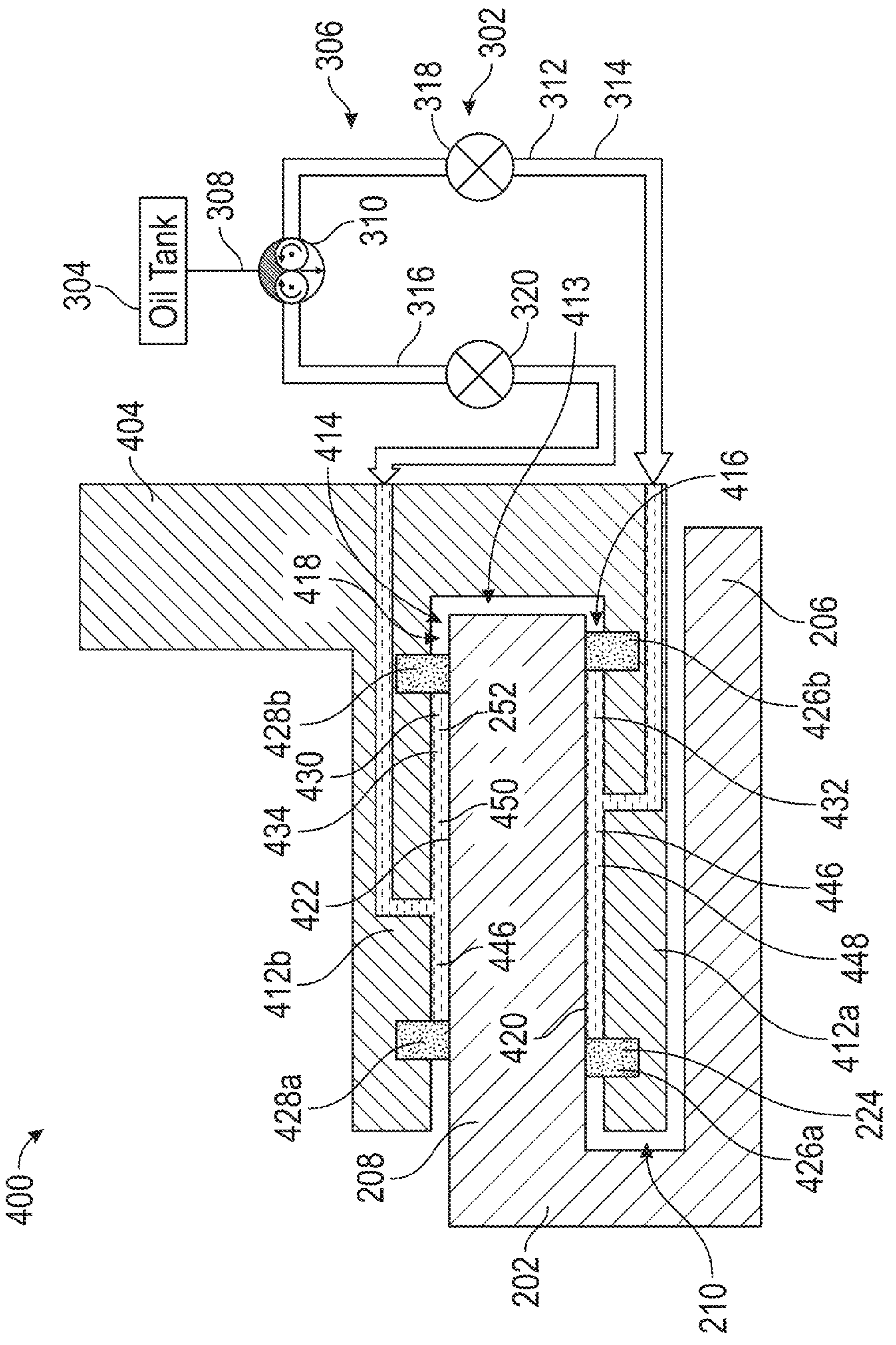
FIG. 6 is a schematic, cross-sectional view of a squeeze film damper assembly, according to another embodiment.

FIG. 6 is a schematic, cross-sectional view of a squeeze film damper assembly 400, according to another embodiment. The squeeze film damper assembly 400 is similar to the squeeze film damper assembly 300 as depicted in FIG. 5. Elements shared between the squeeze film damper assembly 400 and the squeeze film damper assembly 300 will be referred to using the same element numbers, and the description of those elements provided above for FIG. 5 is also applicable to FIG. 6. The squeeze film damper assembly 400 includes a damper housing 404 having an inner housing segment 412*a* and a radially outer housing segment 412*b*. The outer housing segment 412*b* is spaced radially outward from the inner housing segment 412*a*. The inner housing segment 412*a* and the outer housing segment 412*b* define a housing channel 413 therebetween. The annular bearing support 202 and the damper housing 404 are assembled in a nesting configuration with each other. The inner housing segment 412*a* is disposed in the support channel 210 between the inner support segment 206 and the outer support segment 208. Similarly, the outer support segment 208 is disposed in the housing channel 413 between the inner housing segment 412*a* and the outer housing segment 412*b*. In this manner, gaps 414 are defined between the outer support segment 208 and the inner housing segment 412*a* and between the outer support segment 208 and the outer housing segment 412*b*. More specifically, an inner gap 416 is defined between an inner surface 420 of the outer support segment 208 and the inner housing segment 412*a*, and an outer gap 418 is defined between an outer surface 422 of the outer support segment 208 and the outer housing segment 412*b*. Like with the squeeze film damper assembly 300, the plurality of seals 224 are placed at the gaps 414 to define damping chambers 430. In particular, the plurality of seals 224 includes a first inner seal 426*a* and a second inner seal 426*b* placed at the inner gap 416 to define an inner damping chamber 432, and a first outer seal 428*a* a second outer seal 428*b* placed at the outer gap 418 to define an outer damping chamber 434.

The squeeze film damper assembly 400 includes the oil management system 302 to selectively provide the lubricant 252 to the damping chambers 430 to activate squeeze film dampers 446. More specifically, the oil management system 302 selectively provides the lubricant 252 to the inner damping chamber 432 to activate an inner squeeze film damper 448. The oil management system 302 likewise selectively provides the lubricant 252 to the outer damping chamber 434 to activate an outer squeeze film damper 450. The inner squeeze film damper 448 and the outer squeeze film damper 450 provide the dual annular damping regions seen in the previous embodiments. The oil management system 302 includes the first branch circuit 314 fluidly connecting the inner damping chamber 432 to the oil tank 304. The oil management system 302 also includes the second branch circuit 316 fluidly connecting the outer damping chamber 434 to the oil tank 304. The first branch circuit 314 extends through the inner housing segment 412*a* to reach the inner damping chamber 432. The second branch circuit 316 extends through the outer housing segment 412*b* to reach the outer damping chamber 434.

Figure 7:
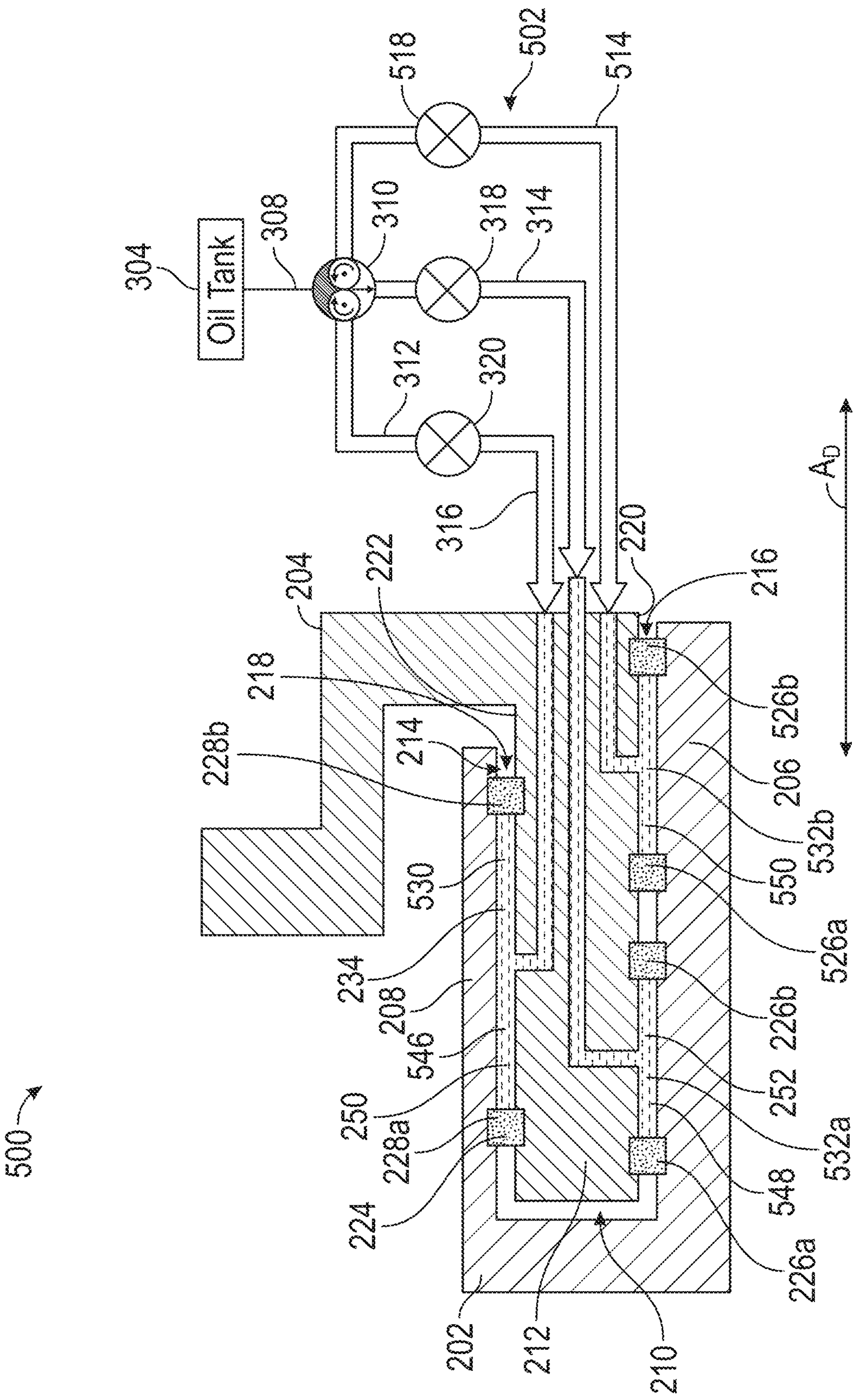
FIG. 7 is schematic, cross-sectional view of a squeeze film damper assembly, according to another embodiment.

FIG. 7 is a schematic, cross-sectional view of a squeeze film damper assembly 500, according to another embodiment. The squeeze film damper assembly 500 is similar to the squeeze film damper assembly 300 as depicted in FIG. 5. Elements shared between the squeeze film damper assembly 500 and the squeeze film damper assembly 300 will be referred to using the same element numbers, and the description of those elements provided above for FIG. 5 is also applicable to FIG. 7. As shown in FIG. 7, the squeeze film damper assembly 500 defines an axial direction $A_D$. The squeeze film damper assembly 500 includes a third inner seal 526*a* and a fourth inner seal 526*b* located at the inner gap 216 to define an additional damping chamber 530 at the inner gap 216. The squeeze film damper assembly 500, therefore, includes a plurality of the damping chambers 530, such as a first inner damping chamber 532*a* and a second inner damping chamber 532*b*, located at the same radial location at the inner gap 216, and the outer damping chamber 234 located at the outer gap 218. Although the second inner damping chamber 532*b* is illustrated to be located at the inner gap 216, the second inner damping chamber 532*b* can, instead, be placed at the outer gap 218 such that the outer gap 218 includes a plurality of damping chambers. The first inner seal 226*a* and the second inner seal 226*b* that define an axial dimension of the first inner damping chamber 532*a* and the third inner seal 526*a* and the fourth inner seal 526*b* that define an axial dimension of the second inner damping chamber 532*b* can be spaced the same distance apart such that the first inner damping chamber 532*a* and the second inner damping chamber 532*b* are sized to be the same axial length, thus providing the same damping level. In some embodiments, the first inner seal 226*a* and the second inner seal 226*b* that define the axial dimension of the first inner damping chamber 532*a* and the third inner seal 526*a* and the fourth inner seal 526*b* that define the axial dimension of the second inner damping chamber 532*b* can be spaced at different distances such that the first inner damping chamber 532*a* and the second inner damping chamber 532*b* are sized to be different axial lengths, thus providing different damping levels.

The squeeze film damper assembly 500 includes an oil management system 502 for controlling the flow of the lubricant 252 into squeeze film dampers 546. The oil management system 502 is similar to the oil management system 302 depicted in FIG. 5, and includes the first branch circuit 314 and the second branch circuit 316. The oil management system 502 further includes a third branch circuit 514 fluidly connecting the oil tank 304 to the second inner damping chamber 532*b*. The third branch circuit 514 includes a third lubricant control valve 518 to independently control the lubricant 252 delivered to the second inner damping chamber 532*b*. The oil management system 502 selectively provides the lubricant 252 to the first inner damping chamber 532*a* to activate a first inner squeeze film damper 548, to the second inner damping chamber 532*b* to activate a second inner squeeze film damper 550, and to the outer damping chamber 234 to activate the outer squeeze film damper 250, where each of the first inner squeeze film damper 548, the second inner squeeze film damper 550, and the outer squeeze film damper 250 can be independently activated.

The inner gap 216 having the first inner squeeze film damper 548 and the second inner squeeze film damper 550 that are selectively and independently activatable provides additional damping levels that can be achieved. For example, as noted above, the first inner damping chamber 532*a* and the second inner damping chamber 532*b* can have different dimensions such that the first inner squeeze film damper 548 and the second inner squeeze film damper 550 can have different damping levels. Thus, in this example, activating the first inner squeeze film damper 548 provides a first damping level, activating the second inner squeeze film damper 550 provides a second damping level, and activating both the first inner squeeze film damper 548 and the second inner squeeze film damper 550 provides a third damping level. Additional damping levels are possible when combining with the outer squeeze film damper 250. The outer damping chamber 234 can be activated by itself, absent the first inner squeeze film damper 548 and the second inner squeeze film damper 550, to provide a fourth damping level different from each of the first, second, and third damping levels. The first inner squeeze film damper 548 can be activated in combination with the outer damping chamber 234 to provide a fifth damping level. The second inner squeeze film damper 550 can be activated in combination with the outer damping chamber 234 to provide a sixth damping level. All three of the first inner squeeze film damper 548, the second inner squeeze film damper 550, and the outer damping chamber 234 can be activated together to provide a seventh damping level.

Figure 8:
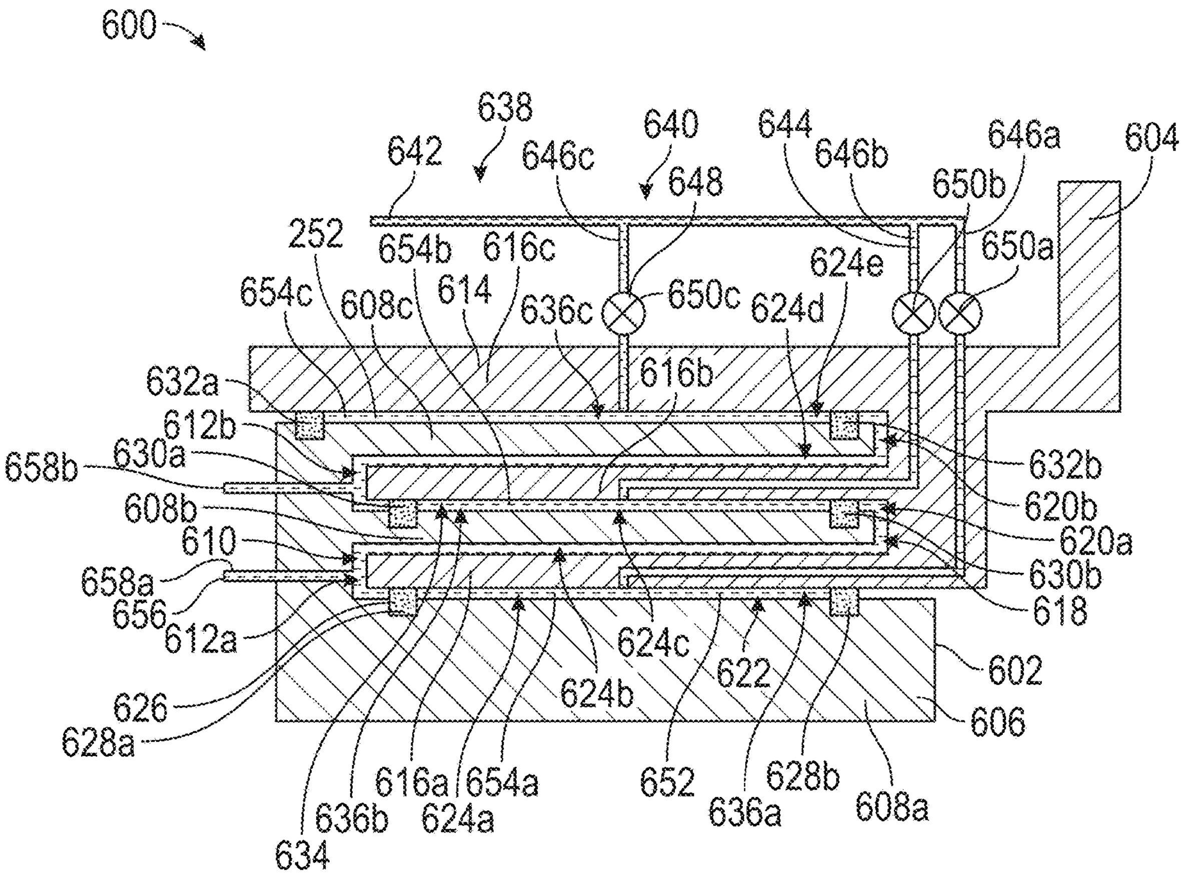
FIG. 8 is a schematic, cross-sectional view of a squeeze film damper assembly, according to another embodiment.

FIG. 8 is a schematic, cross-sectional view of a squeeze film damper assembly 600, according to another embodiment. In the embodiment of FIG. 8, the squeeze film damper assembly 600 includes an annular bearing support 602 and a damper housing 604. The annular bearing support 602 includes at least three support segments 606, also referred to as spring fingers. The support segments 606 include an inner support segment 608*a*, at least one middle support segment 608*b*, and an outer support segment 608*c*. The outer support segment 608*c* is loaded radially outward of the inner support segment 608*a*. The middle support segment 608*b* is located radially between the inner support segment 608*a* and the outer support segment 608*c*. Adjacent support segments 606 of the squeeze film damper assembly 600 define support channels 610 therebetween. More specifically, the inner support segment 608*a* and the middle support segment 608*b* define an inner support channel 612*a* therebetween. The middle support segment 608*b* and the outer support segment 608*c* define an outer support channel 612*b* therebetween. The support segments 606 can be made as an integral structure with the annular bearing support 602, via methods known in the art such as casting, machining, additive manufacturing, or the like, such that the annular bearing support 602 and the support segments 606 are a unitary structure. In some embodiments, the support segments 606 can, instead, be a separate body attachable to the annular bearing support 602, with the support segments 606 being attachable to the annular bearing support 602 via means known in the art, such as by welding, brazing, fastening, or the like.

The damper housing 604 includes at least three housing segments 614. The housing segments 614 include an inner housing segment 616*a*, at least one middle housing segment 616*b*, and an outer housing segment 616*c*. The outer housing segment 616*c* is located radially outward of the inner housing segment 616*a*. The middle housing segment 616*b* is located radially between the inner housing segment 616*a* and the outer housing segment 616*c*. Adjacent housing segments 614 of the squeeze film damper assembly 600 define housing channels 618 therebetween. More specifically, the inner housing segment 616*a* and the middle housing segment 616*b* define an inner housing channel 620*a* therebetween. The middle housing segment 616*b* and the outer housing segment 616*c* define an outer housing channel 620*b* therebetween. The housing segments 614 can be made as an integral structure with the damper housing 604, via methods known in the art such as casting, machining, additive manufacturing, or the like, such that the damper housing 604 and the housing segments 614 are a unitary structure. In some embodiments, the housing segments 614 can, instead, be attachable to the damper housing 604 via means known in the art, such as by welding, brazing, fastening, or the like.

Referring still to FIG. 8, the support segments 606 of the annular bearing support 602 and the housing segments 614 of the damper housing 604 are disposed in an alternating arrangement. More specifically, the support segments 606 and the housing segments 614 alternate such that the middle support segment 608*b* is disposed in the inner housing channel 620*a*, the outer support segment 608*c* is disposed in the outer housing channel 620*b*, the inner housing segment 616*a* is disposed in the inner support channel 612*a*, and the middle housing segment 616*b* is disposed in the outer support channel 612*b*. The support segments 606 are arranged in the housing channels 618 and the housing segments 614 are arranged in the support channels 610 to define gaps 622. The gaps 622 can include a first gap 624*a* located radially between the inner support segment 608*a* and the inner housing segment 616*a*, a second gap 624*b* located radially between the inner housing segment 616*a* and the middle support segment 608*b*, a third gap 624*c* between the middle support segment 608*b* and the middle housing segment 616*b*, a fourth gap 624*d* between the middle housing segment 616*b* and the outer support segment 608*c*, and a fifth gap 624*e* between the outer support segment 608*c* and the outer housing segment 616*c*.

The squeeze film damper assembly 600 further includes a plurality of seals 626 disposed in the gaps 622. The seals 626 serve the same purpose as the seals 224 (FIG. 3) of the squeeze film damper assembly 200 (FIG. 3) and define a plurality of damping chambers 634. In particular, the seals 626 includes a first inner seal 628*a* and a second inner seal 628*b* disposed at the first gap 624*a* to define an inner damping chamber 636*a*, a first middle seal 630*a* and a second middle seal 630*b* disposed at the third gap 624*c* to define a middle damping chamber 636*b*, and a first outer seal 632*a* and a second outer seal 632*b* disposed at the fifth gap 624*e* to define an outer damping chamber 636*c*. The first inner seal 628*a* and the second inner seal 628*b* are axially spaced from each other to define an axial dimension of the inner damping chamber 636*a*. The first middle seal 630*a* and the second middle seal 630*b* are axially spaced from each other to define an axial dimension of the middle damping chamber 636*b*. The first outer seal 632*a* and the second outer seal 632*b* are axially spaced from each other to define an axial dimension of the outer damping chamber 636*c*.

The squeeze film damper assembly 600 includes an oil management system 638 for variably delivering the lubricant 252, such as the oil, to the damping chambers 634. The oil management system 638 can include the same oil tank 304 and the pump 310 (not shown) from the embodiment of FIG. 5. The oil management system 638 includes a lubricant circuit 640 fluidly connecting the damping chambers 634 to the lubricant source, such as the oil tank 304 (FIG. 5). The lubricant circuit 640 is at least partially formed in the damper housing 604. The lubricant circuit 640 includes a main circuit 642 and a plurality of branch circuits 644 extending from the main circuit 642. The main circuit 642 is fluidly connected to the oil tank 304 (FIG. 5). The main circuit 642 is disposed external to the squeeze film damper assembly 600. The branch circuits 644 extend from the main circuit 642 external to the squeeze film damper assembly 600 and into and through the housing segments 614 of the damper housing 604. In particular, the branch circuits 644 include a first branch circuit 646*a* fluidly connecting the main circuit 642 to the inner damping chamber 636*a*, a second branch circuit 646*b* fluidly connecting the main circuit 642 to the middle damping chamber 636*b*, and a third branch circuit 646*c* fluidly connecting the main circuit 642 to the outer damping chamber 636*c*. The lubricant circuit 640 further includes a plurality of lubricant return passages 656, also referred to as oil exits, to capture and to return any lubricant leaking from the damping chambers 634 past the seals 626 to the oil tank 304 (FIG. 5). In particular, the lubricant return passages 656 include an inner return passage 658*a* and an outer return passage 658*b*. The lubricant 252 in the lubricant return passages 656 is collected in a sump (not shown) and is returned to the oil tank 304 (FIG. 5) with a scavenge pump (not shown).

The oil management system 638 further includes a plurality of valves 648 to control the amount of lubricant delivered to each of the damping chambers 634. In particular, the plurality of valves 648 includes a first valve 650*a* disposed in the first branch circuit 646*a* to variably control lubricant delivery to the inner damping chamber 636*a*, a second valve 650*b* disposed in the second branch circuit 646*b* to variably control lubricant delivery to the middle damping chamber 636*b*, and a third valve 650*c* disposed in the third branch circuit 646*c* to variably control lubricant delivery to the outer damping chamber 636*c*. A respective squeeze film damper 652 is activated at each of the damping chambers 634 as the lubricant 252 is delivered to each of the damping chambers 634. In this manner, each damper can be independently activated. More specifically, the lubricant 252 being delivered to the inner damping chamber 636*a* activates an inner squeeze film damper 654*a*. The lubricant 252 being delivered to the middle damping chamber 636*b* activates a middle squeeze film damper 654*b*. The lubricant 252 being delivered to the outer damping chamber 636*c* activates an outer squeeze film damper 654*c*. The inner squeeze film damper 654*a*, the middle squeeze film damper 654*b*, and the outer squeeze film damper 654*c* provide dampers at three different radial locations, with each of the squeeze film dampers 652 providing a different damping level. Similar to the embodiment of FIG. 5, different combinations of each of the squeeze film dampers 652 can be activated to provide multiple damping levels. Having squeeze film dampers at three different radial locations is by example only. In some embodiments, squeeze film dampers can be provided at additional different radial locations, such as at four, five, or any other number of different radial locations.

Each of the support segments 606 of the annular bearing support 602 and each of the housing segments 614 of the damper housing 604 can be the same thickness. In some embodiments, each of the support segments 606 of the annular bearing support 602 and each of the housing segments 614 of the damper housing 604 can have different thicknesses. A particular support segment 606 or a particular housing segment 614 having a different thickness leads to that particular support segment 606 or that particular housing segment 614 having a different stiffness. The particular support segment 606 or the particular housing segment 614 having the different stiffness can alter the damping level of adjacent squeeze film dampers 652. Each of the support segments 606 of the annular bearing support 602 and each of the housing segments 614 of the damper housing 604 can also be lined with a soft material, such as a viscoelastic material or felt, or coated with a damping material. Lining or coating each of the housing segments 614 provides a baseline level of structural damping if an oil interruption event in the squeeze film damper assembly 600 were to occur, such that no lubricant is provided to the damping chambers 634, and, as a result, the squeeze film dampers 652 of the squeeze film damper assembly 600 are not activated.

Figure 9:
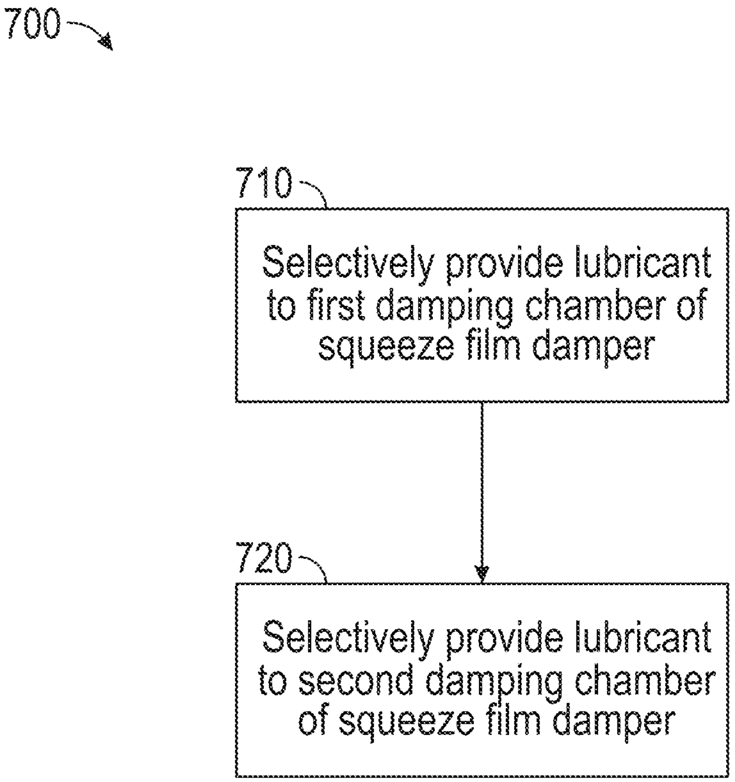
FIG. 9 is a flowchart showing a method of damping vibrations of a rotating component of a turbine engine via a squeeze film damper assembly, such as the squeeze film damper assembly of FIGS. 3 to 8, according to the present disclosure.

FIG. 9 is a flowchart showing a method 700 of damping vibrations of the rotating component 120 of the turbine engine 10 via a squeeze film damper assembly. While reference is made to the squeeze film damper assembly 300 of FIG. 5, the method 700 can be utilized with any one of the squeeze film damper assemblies 200, 300, 400, 500, and 600 of FIGS. 3 to 8.

In step 710, the method 700 includes selectively providing lubricant to a first damping chamber of a squeeze film damper assembly. For example, with reference to the squeeze film damper assembly 300 of FIG. 5, the step 710 includes providing lubricant, via the pump 310, from the oil tank 304 to the inner damping chamber 232 by way of the first branch circuit 314.

In step 720, the method 700 includes selectively providing lubricant to a second damping chamber of a squeeze film damper assembly. For example, with reference to the squeeze film damper assembly 300 of FIG. 5, the step 720 includes providing lubricant, via the pump 310, from the oil tank 304 to the outer damping chamber 234 by way of the second branch circuit 316. In some embodiments, the step 720 may be performed before the step 710. In some embodiments, the steps 710 and 720 may be performed simultaneously. In some embodiments, one of the steps 710 or 720 may be omitted. In some embodiments, such as when the method 700 is utilized with the squeeze film damper assembly 400 of FIG. 6, an additional step may be added to selectively provide lubricant to a third damping chamber.

Figure 10:
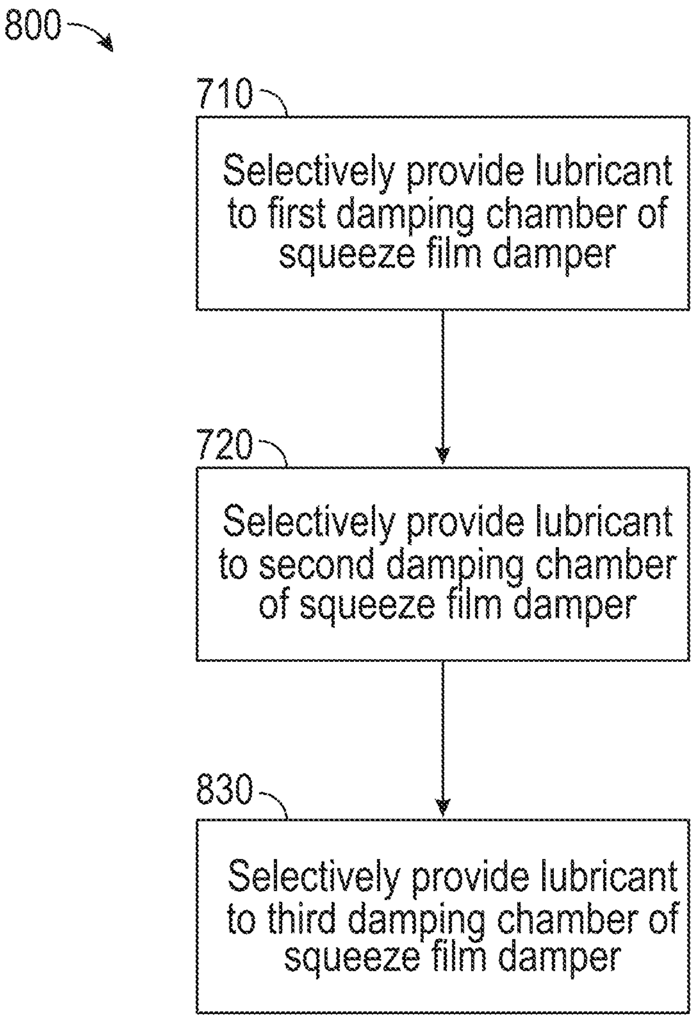
FIG. 10 is a flowchart showing a method of damping vibrations of a rotating component of a turbine engine via a squeeze film damper assembly, such as the squeeze film damper assembly of FIGS. 7 and 8, according to the present disclosure.

FIG. 10 is a flowchart showing a method 800 of damping vibrations of the rotating component 120 of the turbine engine 10 via a squeeze film damper assembly. The method 800 is similar to the method 700 as depicted in FIG. 9. Elements shared between the method 800 and the method 700 will be referred to using the same element numbers, and the description of those elements provided above for FIG. 9 is also application to FIG. 10. While reference is made to the squeeze film damper assembly 500 of FIG. 7, the method 800 can be utilized with any one of the squeeze film damper assemblies 200, 300, 400, 500, and 600 of FIGS. 3 to 8.

The method 800 includes the step 710 and the step 720 as in the method 700, and further includes step 830. In the step 830, the method 800 includes selectively providing lubricant to a third damping chamber of a squeeze film assembly. For example, with reference to the squeeze film damper assembly 500 of FIG. 7, the step 710 includes providing the lubricant 252, via the pump 310, from the oil tank 304 to the first inner damping chamber 532*a* by way of the first branch circuit 314. The step 830 includes providing the lubricant 252 to the second inner damping chamber 532*b* by way of the third branch circuit 514. The steps 710, 720, and 830 can be performed in any order. As an example, the step 710 can be performed first, the step 720 can be performed second, and the step 830 can be performed last. In some embodiments, for example, the step 720 can be performed first instead. In some embodiments, for example, the step 830 can be performed first. In some embodiments, at least one of steps 710, 720, or 830 may be omitted.

Accordingly, the present disclosure provides for an improved squeeze film damper assembly for a bearing damper assembly of a turbine engine that provides for variable damping modes that can be used for various operating modes of the turbine engine. Particularly, embodiments of the present disclosure provide a squeeze film damper assembly with multiple annular damping regions at multiple different radial locations that can be activated independent of one another to provide various damping values of the squeeze film damper assembly. This can provide for increased operational performance and durability of the bearing damper assembly and the turbine engine over a range of operating speeds.

Further aspects are provided by the subject matter of the following clauses.

A squeeze film damper assembly for a turbine engine, the squeeze film damper assembly including an annular bearing support including an inner support segment and an outer support segment located radially outward of the inner support segment, the inner support segment and the outer support segment spaced apart to define a support channel therebetween, and an annular damper housing at least partially received in the support channel to define an inner damping chamber and an outer damping chamber, the inner damping chamber being radially inward of the outer damping chamber, the inner damping chamber and the outer damping chamber each capable of being filled with an amount of lubricant to provide a squeeze film damper at the inner damping chamber, the outer damping chamber, or both.

The squeeze film damper assembly of the preceding clause, the inner damping chamber including a plurality of seals spaced apart in an axial direction to define an axial dimension of the inner damping chamber, and the outer damping chamber including a plurality of seals spaced apart in an axial direction to define an axial dimension of the outer damping chamber.

The squeeze film damper assembly of any preceding clause, further including a controller to individually control the amount of lubricant provided to the inner damping chamber and the outer damping chamber.

The squeeze film damper assembly of any preceding clause, further including selectively providing the amount of lubricant to the inner damping chamber to activate an inner squeeze film damper and selectively providing the amount of lubricant to the outer damping chamber to activate an outer squeeze film damper.

The squeeze film damper assembly of any preceding clause, the inner damping chamber being located radially between the inner support segment of the annular bearing support and a radially inner surface of the damper housing.

The squeeze film damper assembly of any preceding clause, one of the inner damping chamber or the outer damping chamber being located radially between the outer support segment of the annular bearing support and a radially outer surface of the damper housing.

The squeeze film damper assembly of any preceding clause, the inner damping chamber being sized to provide a squeeze film damper providing a first damping value, and the outer damping chamber is sized to provide a squeeze film damper providing a second damping value different from the first damping value.

The squeeze film damper assembly of the preceding clause, the first damping value and the second damping value targeting different vibration modes of a rotating component.

The squeeze film damper assembly of any preceding clause, further including a lubricant source fluidly connected to the inner damping chamber by a first lubricant circuit and to the outer damping chamber by a second lubricant circuit.

The squeeze film damper assembly of the preceding clause, the first lubricant circuit including a lubricant control valve to control an amount of lubricant provided to the inner damping chamber and the second lubricant circuit includes a lubricant control valve to control an amount of lubricant provided to the outer damping chamber.

The squeeze film damper assembly of any preceding clause, the damper housing including an inner housing segment and an outer housing segment located radially outward of the inner housing segment, the inner housing segment and the outer housing segment spaced apart to define a housing channel therebetween.

The squeeze film damper assembly of the preceding clause, the outer damping chamber being located between the outer support segment of the annular bearing support and the outer housing segment of the damper housing.

The squeeze film damper assembly of any preceding clause, further including a third damping chamber located radially outward of the inner damping chamber and radially inward of the outer damping chamber.

The squeeze film damper assembly of the preceding clause, further including a third damping chamber located at a same radial location as, and axially spaced apart from, one of the inner damping chamber or the outer damping chamber.

The squeeze film damper assembly of any preceding clause, further including a third lubricant circuit fluidly connecting the third damping chamber to a lubricant source, the third lubricant circuit including a third lubricant control valve to control an amount of lubricant provided to the third damping chamber.

The squeeze film damper assembly of any preceding clause, wherein the third damping chamber is sized to provide a squeeze film damper providing a third damping value.

The squeeze film damper assembly of any preceding clause, wherein the third damping value is the same as at least one of the first damping value or the second damping value.

The squeeze film damper assembly of any preceding clause, wherein the third damping value is different than both the first damping value and the second damping value.

The squeeze film damper assembly of any preceding clause, further including a plurality of lubricant return passages to capture lubricant leaking from the damping chambers and to return the lubricant leaking from the damping chambers to the lubricant source.

The squeeze film damper assembly of the preceding clause, wherein the plurality of lubricant return passages includes an inner return passage and an outer return passage.

A method of damping vibrations of a rotating component of a turbine engine, the method including selectively providing lubricant to a first damping chamber to activate a first squeeze film damper, the first damping chamber fluidly connected to a lubricant source by a first lubricant circuit, the first lubricant circuit including a first lubricant control valve, and a second damping chamber to activate a second squeeze film damper, the second damping chamber fluidly connected to the lubricant source by a second lubricant circuit, the second lubricant circuit including a second lubricant control valve.

The method of the preceding clause, the first squeeze film damper providing a first damping value, and the second squeeze film damper providing a second damping value different from the first damping value.

The method of the preceding clause, the first damping value and the second damping value targeting different vibration modes of a rotating component.

The method of any preceding clause, further comprising selectively providing the lubricant to a third damping chamber to activate a third squeeze film damper, the third damping chamber fluidly connected to the lubricant source by a third lubricant circuit, the third lubricant circuit including a third lubricant control valve.

The method of the preceding clause, the third squeeze film damper providing a third damping value that is different from at least one of the first damping value or the second damping value.

The method of any preceding clause, further including a first operational configuration wherein only the first squeeze film damper is activated.

The method of any preceding clause, further including a second operational configuration wherein only the second squeeze film damper is activated.

The method of any preceding clause, further including a third operational configuration wherein both the first squeeze film damper and the second squeeze film damper are activated.

The method of any preceding clause, further including a fourth operational configuration wherein neither the first squeeze film damper nor the second squeeze film damper is activated.

A turbine engine includes at least one squeeze film damper assembly, the at least one squeeze film damper assembly including an annular bearing support including an inner support segment and an outer support segment located radially outward of the inner support segment, the inner support segment and the outer support segment spaced apart to define a support channel therebetween, and an annular damper housing at least partially received in the support channel to define an inner damping chamber and an outer damping chamber, the inner damping chamber being radially inward of the outer damping chamber, the inner damping chamber and the outer damping chamber each capable of being filled with an amount of lubricant to provide a squeeze film damper at the inner damping chamber, the outer damping chamber, or both.

The turbine engine of the preceding clause, the inner damping chamber including a plurality of seals spaced apart in an axial direction to define an axial dimension of the inner damping chamber, and the outer damping chamber including a plurality of seals spaced apart in an axial direction to define an axial dimension of the outer damping chamber.

The turbine engine of any preceding clause, further including a controller to individually control the amount of lubricant provided to the inner damping chamber and the outer damping chamber.

The turbine engine of any preceding clause, further including selectively providing the amount of lubricant to the inner damping chamber to activate an inner squeeze film damper and selectively providing the amount of lubricant to the outer damping chamber to activate an outer squeeze film damper.

The turbine engine of any preceding clause, the inner damping chamber being located radially between the inner support segment of the annular bearing support and a radially inner surface of the damper housing.

The turbine engine of any preceding clause, one of the inner damping chamber or the outer damping chamber being located radially between the outer support segment of the annular bearing support and a radially outer surface of the damper housing.

The turbine engine of any preceding clause, the inner damping chamber being sized to provide a squeeze film damper providing a first damping value, and the outer damping chamber is sized to provide a squeeze film damper providing a second damping value different from the first damping value.

The turbine engine of the preceding clause, the first damping value and the second damping value targeting different vibration modes of a rotating component.

The turbine engine of any preceding clause, further including a lubricant source fluidly connected to the inner damping chamber by a first lubricant circuit and to the outer damping chamber by a second lubricant circuit.

The turbine engine of the preceding clause, the first lubricant circuit including a lubricant control valve to control an amount of lubricant provided to the inner damping chamber and the second lubricant circuit includes a lubricant control valve to control an amount of lubricant provided to the outer damping chamber.

The turbine engine of any preceding clause, the damper housing including an inner housing segment and an outer housing segment located radially outward of the inner housing segment, the inner housing segment and the outer housing segment spaced apart to define a housing channel therebetween.

The turbine engine of the preceding clause, the outer damping chamber being located between the outer support segment of the annular bearing support and the outer housing segment of the damper housing.

The turbine engine of any preceding clause, further including a third damping chamber located radially outward of the inner damping chamber and radially inward of the outer damping chamber.

The turbine engine of the preceding clause, further including a third damping chamber located at a same radial location as, and axially spaced apart from, one of the inner damping chamber or the outer damping chamber.

The turbine engine of any preceding clause, further including a third lubricant circuit fluidly connecting the third damping chamber to a lubricant source, the third lubricant circuit including a third lubricant control valve to control an amount of lubricant provided to the third damping chamber.

The turbine engine of any preceding clause, wherein the third damping chamber is sized to provide a squeeze film damper providing a third damping value.

The turbine engine of any preceding clause, wherein the third damping value is the same as at least one of the first damping value or the second damping value.

The turbine engine of any preceding clause, wherein the third damping value is different than both the first damping value and the second damping value.

The turbine engine of any preceding clause, further including a plurality of lubricant return passages to capture lubricant leaking from the damping chambers and to return the lubricant leaking from the damping chambers to the lubricant source.

The turbine engine of the preceding clause, wherein the plurality of lubricant return passages includes an inner return passage and an outer return passage.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A squeeze film damper assembly for a turbine engine, the squeeze film damper assembly comprising:

an annular bearing support configured to support a rotating component, the annular bearing support including an inner support segment and an outer support segment located radially outward of the inner support segment, the inner support segment and the outer support segment spaced apart to define a support channel therebetween; and an annular damper housing at least partially received in the support channel to define an inner damping chamber and an outer damping chamber, the inner damping chamber being radially inward of the outer damping chamber, the inner damping chamber and the outer damping chamber each capable of being filled with an amount of lubricant to provide a squeeze film damper at the inner damping chamber, the outer damping chamber, or both, the annular damper housing capable of moving radially relative to the annular bearing support to alter a radial dimension of at least one of the inner damping chamber or the outer damping chamber.

2. The squeeze film damper assembly of claim 1, wherein the inner damping chamber includes a plurality of seals spaced apart in an axial direction to define an axial dimension of the inner damping chamber, and the outer damping chamber includes a plurality of seals spaced apart in an axial direction to define an axial dimension of the outer damping chamber.

3. The squeeze film damper assembly of claim 1, further comprising a controller to individually control the amount of lubricant provided to the inner damping chamber and the outer damping chamber.

4. The squeeze film damper assembly of claim 1, wherein selectively providing the amount of lubricant to the inner damping chamber activates an inner squeeze film damper and selectively providing the amount of lubricant to the outer damping chamber activates an outer squeeze film damper.

5. The squeeze film damper assembly of claim 1, wherein the inner damping chamber is located radially between the inner support segment of the annular bearing support and a radially inner surface of the annular damper housing.

6. The squeeze film damper assembly of claim 1, wherein one of the inner damping chamber or the outer damping chamber is located radially between the outer support segment of the annular bearing support and a radially outer surface of the damper housing.

7. The squeeze film damper assembly of claim 1, further comprising a third damping chamber located radially outward of the inner damping chamber and radially inward of the outer damping chamber.

8. The squeeze film damper assembly of claim 1, further comprising a third damping chamber located at a same radial location as, and axially spaced apart from, one of the inner damping chamber or the outer damping chamber.

9. The squeeze film damper assembly of claim 8, further comprising a third lubricant circuit fluidly connecting the third damping chamber to a lubricant source, the third lubricant circuit including a third lubricant control valve to control an amount of lubricant provided to the third damping chamber.

10. The squeeze film damper assembly of claim 1, wherein the inner damping chamber is sized to provide a squeeze film damper providing a first damping value, and the outer damping chamber is sized to provide a squeeze film damper providing a second damping value different from the first damping value.

11. The squeeze film damper assembly of claim 10, wherein the first damping value and the second damping value target different vibration modes of a rotating component.

12. The squeeze film damper assembly of claim 1, further comprising a lubricant source fluidly connected to the inner damping chamber by a first lubricant circuit and to the outer damping chamber by a second lubricant circuit.

13. The squeeze film damper assembly of claim 12, wherein the first lubricant circuit includes a lubricant control valve to control an amount of lubricant provided to the inner damping chamber and the second lubricant circuit includes a lubricant control valve to control an amount of lubricant provided to the outer damping chamber.

14. The squeeze film damper assembly of claim 1, wherein the damper housing includes an inner housing segment and an outer housing segment located radially outward of the inner housing segment, the inner housing segment and the outer housing segment spaced apart to define a housing channel therebetween.

15. The squeeze film damper assembly of claim 14, wherein the outer damping chamber is located between the outer support segment of the annular bearing support and the outer housing segment of the damper housing.

16. A method of damping vibrations of a rotating component of a turbine engine, the method comprising:

selectively providing lubricant to:

a first damping chamber to activate a first squeeze film damper, the first damping chamber fluidly connected to a lubricant source by a first lubricant circuit, the first lubricant circuit including a first lubricant control valve; and a second damping chamber to activate a second squeeze film damper, the second damping chamber fluidly connected to the lubricant source by a second lubricant circuit, the second lubricant circuit including a second lubricant control valve, the first damping chamber and the second damping chamber defined by an annular damper housing at least partially received between an inner support segment and an outer support segment of an annular bearing support, the annular damper housing being capable of moving radially relative to the annular bearing support to alter a radial dimension of at least one of the first damping chamber or the second damping chamber.

17. The method of claim 16, wherein the first squeeze film damper provides a first damping value, and the second squeeze film damper provides a second damping value different from the first damping value.

18. The method of claim 17, wherein the first damping value and the second damping value target different vibration modes of a rotating component.

19. The method of claim 16, further comprising selectively providing the lubricant to a third damping chamber to activate a third squeeze film damper, the third damping chamber fluidly connected to the lubricant source by a third lubricant circuit, the third lubricant circuit including a third lubricant control valve.

20. The method of claim 19, wherein the first squeeze film damper provides a first damping value, the second squeeze film damper provides a second damping value, and the third squeeze film damper provides a third damping value that is different from at least one of the first damping value or the second damping value.

* * * * *